United States Patent
Ho

(10) Patent No.: US 7,911,949 B2
(45) Date of Patent: Mar. 22, 2011

(54) METHOD FOR NETWORK TRANSMISSION

(75) Inventor: Kuan-Hu Ho, Hsinchu (TW)

(73) Assignee: Arcadyan Technology Corp., Hsinchu (TW)

( * ) Notice: Subject to any disclaimer, the term of this patent is extended or adjusted under 35 U.S.C. 154(b) by 98 days.

(21) Appl. No.: 12/317,988

(22) Filed: Dec. 30, 2008

(65) Prior Publication Data
US 2009/0245105 A1    Oct. 1, 2009

(30) Foreign Application Priority Data

Apr. 1, 2008  (TW) ................ 97111913 A

(51) Int. Cl.
*H04L 12/56* (2006.01)
(52) U.S. Cl. ........................ 370/231; 370/252
(58) Field of Classification Search .......... 370/231, 370/252, 229–230
See application file for complete search history.

(56) References Cited

U.S. PATENT DOCUMENTS

| | | | | |
|---|---|---|---|---|
| 6,907,460 B2 * | 6/2005 | Loguinov et al. | ............. | 709/224 |
| 7,180,871 B1 * | 2/2007 | Khaflzov et al. | ............. | 370/252 |
| 7,193,971 B2 * | 3/2007 | McClellan | ............. | 370/238 |
| 7,417,956 B2 * | 8/2008 | Nakazawa | ............. | 370/252 |
| 2005/0169180 A1 * | 8/2005 | Ludwig | ............. | 370/231 |
| 2006/0092838 A1 * | 5/2006 | Lee | ............. | 370/229 |
| 2007/0230337 A1 * | 10/2007 | Igarashi et al. | ............. | 370/230 |
| 2008/0165684 A1 * | 7/2008 | Sridharan et al. | ............. | 370/231 |
| 2008/0291911 A1 | 11/2008 | Lee et al. | | |

OTHER PUBLICATIONS

Z. Zhang et al., "Fuzzy Logic Strategy of Prognosticating TCP's Timeout and Retransmission", Studies in Computational Intelligence, Chapter 22, vol. 2, Jan. 1, 2005, pp. 309-319, www.springerlink.com, XP008127367.

Zhi Li, "Fuzzy Logic Based Robust Control of Queue Management and Optimal Treatment of Traffic over TCP/IP Networks", 2005,pp. 1-238, htpp://eprints.usq.edu.au/1461/2/Li_2005_whole.pdf, xp002602793.

* cited by examiner

*Primary Examiner* — Kwang B Yao
*Assistant Examiner* — Candal Elpenord
(74) *Attorney, Agent, or Firm* — Haverstock & Owens LLP

(57) ABSTRACT

The method for the network transmission adjusts retransmission timeout timer (RTO) with the fuzzy rule to make the value of RTO change with network traffic. The method not only minimizes retransmission and lost packets, but also keeps utilization higher. The method is used to solve the congestion collapse problem in network transmission.

10 Claims, 4 Drawing Sheets

METHOD FOR NETWORK TRANSMISSION

FIELD OF THE INVENTION

The present invention relates generally to a network transmission method and, in particular, to a network transmission method which is capable of solving the congestion collapse problem in cable network.

BACKGROUND OF THE INVENTION

AS the modern technology progresses, the Internet has became more indispensable to people. A transmission of a huge amount of digital information through a network will easily cause the congestion collapse problem, which leads to stop working and serious damages.

Transmission Control Protocol (TCP), for example, is used extensively by many of the internet's most popular application protocols. In the TCP's congestion control mechanism, a TCP sender transmits a packet, and then starts a retransmission timer to clock the round-trip time (RTT) of the packet so as to ensure that the packet will be successfully transmitted. When a TCP receiver successfully receives the packet, it will transmit an acknowledgment (ACK) of the packet to the TCP sender to acknowledge receipt of a packet. The mechanism attempts to avoid the congestion collapse problem and to make the transmission smooth.

If the network causes the delay of the packet transmission to make RTT longer than retransmission timeout (RTO), the TCP sender will consider the situation as "packet loss", and then retransmit the packet and restart the retransmission timer. If the TCP sender receives the ACK within the RTO, the retransmission timer clocking the RTT of the packet will stop and restart clocking when the next packet is transmitted.

The TCP's congestion control mechanism uses a timer to prevent the packet loss problem and to avoid congestion collapse problem. However, there is still a possibility which makes the network congested. If the network load is heavy, the delay of the packet transmission will increase and the RTT of the packet will also increase. As a result, the TCP sender retransmits the packet, which will lead to more retransmissions. The procedure is repeated and the network load becomes more and more heavy. Finally, the network may become congested and blocked, and the transmission is collapsed.

Accordingly, a method for a network transmission to solve the above problems is developed. The inventors purpose to rectify those drawbacks and provide the method for the network transmission that adjusts retransmission timer with the fuzzy rule to make the RTO change with network traffic. The method not only minimizes retransmission and lost packets but also keeps utilization higher. The method is used to solve the congestion collapse problem in network transmission.

SUMMARY OF THE INVENTION

In accordance with one respect of the present invention, a method for a network transmission is provided. The method for the network transmission includes the steps of transmitting a plurality of packets, clocking a round trip time (RTT) for each the packet, and setting a first RTT as a retransmission timeout (RTO), obtaining a difference between two RTTs respectively corresponding to two adjacent packets of the plurality of packets, employing the RTT and the time difference to generate an inference according to a fuzzy rule, outputting the inference, and modifying the RTO based on the inference.

Preferably, the method for the network transmission applied to a cable network.

Preferably, the RTT, the difference, and the inference are defined as linguistic variables in the fuzzy rule.

Preferably, the RTT is defined as a first membership function comprising a plurality of overlapped sets, the difference is defined as a second membership function comprising a plurality of overlapped sets, and the inference is defined as a third membership function comprising a plurality of non-overlapped sets.

In accordance with the aforementioned of the present invention, a network transmission system is provided. The network transmission system includes a transmitting side transmitting a plurality of packets, a receiving side connected to the transmitting side and receiving the plurality of packets, a retransmission timeout (RTO) timer disposed in the receiving side, clocking a round trip time (RTT) for each of the plurality of packets, setting the RTT of a first packet of the plurality of packets as an RTO, and obtaining a difference between two RTTs respectively corresponding to two adjacent packets of the plurality of packets, an inference engine connected to the RTO timer receiving the RTT and the difference to obtain an inference, and modifying the RTO based on the inference.

Preferably, the method for the network transmission applied to a cable network.

Preferably, the inference engine is a fuzzy inference engine and the inference is obtained based on a fuzzy rule.

Preferably, the RTU, the difference, and the inference are defined as linguistic variables in the fuzzy rule.

Preferably, the RTT is defined as a first membership function comprising a plurality of overlapped sets, and the difference of RTTs is defined as a second membership function comprising a plurality of overlapped sets, and the inference is defined as a third membership function comprising a plurality of non-overlapped sets.

Preferably, the transmitting and the receiving sides are connected by a network.

In accordance with the aforementioned of the present invention, a method for improving a network transmitting efficiency is provided. The method for improving a network transmitting efficiency includes clocking a round trip time (RTT) for a plurality of packets, setting a first RTT as a retransmission timeout (RTO), obtaining a difference between two RTTs respectively corresponding to two adjacent packets of the plurality of packets, generating a parameter according to the RTT and the difference from a fuzzy rule, determining whether the RTO should be modified according to the parameter.

Preferably, the method for improving a network transmitting efficiency further includes a step of: transmitting a plurality of packets.

Preferably, the RTT is defined as a first membership function comprising a plurality of overlapped sets, and the difference of RTTs is defined as a second membership function comprising a plurality of overlapped sets, and the inference is defined as a third membership function comprising a plurality of non-overlapped sets.

The foregoing and other features and advantages of the present invention will be more clearly understood through the following descriptions with reference to the drawings, wherein:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
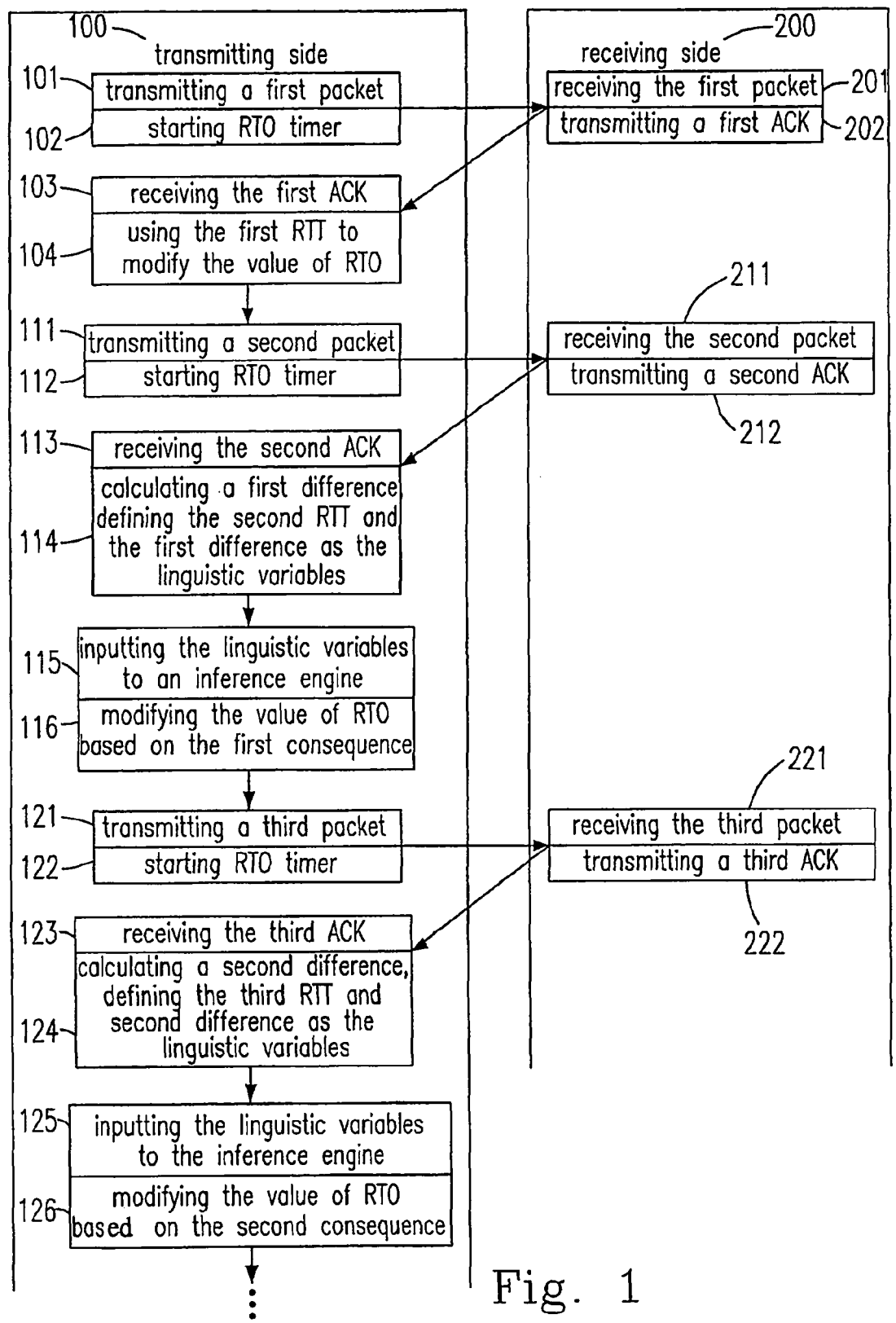
FIG. 1 is a flowchart showing a method for a network transmission in accordance with an embodiment of the present invention.

Please refer to FIG. 1, which is a flowchart showing a method for a network transmission under Transmission Control Protocol (TCP) according to an embodiment of the present invention.

As shown in FIG. 1, a transmitting side 100 transmits a first packet (101) to a receiving side 200, and starts a retransmission timeout timer (RTO timer) clocking a first round trip time (RTT) for the first packet (102). When the receiving side 200 receives the first packet (201), the receiving side 200 transmits a first acknowledgment (ACK) (202) to the transmitting side 100. If the transmitting side 100 receives the first ACK (103), the RTO timer will use a first RTT of the first packet to modify the value of RTO (104).

In the above steps, the RTO timer still has an initial value of RTO to prevent the situation that the first ACK fails to transmit to the transmitting side 100, e.g. the first packet is lost. When the first packet transmits to the receiving side 200 successfully, the first RTT may use to modify the initial value of RTO for the next packet transmitting.

After the step (104), the transmitting side 100 transmits a second packet (111) to the receiving side 200, and starts the RTO timer clocking a second RTT for the second packet (112). When the receiving side 200 receives the second packet (211), the receiving side 200 transmits a second ACK (212) to the transmitting side 100. If the second RTT is larger than the value of RTO or the second ACK is not received by the transmitting side 100, the second packet will be considered lost. Then the transmitting side 100 retransmits the second packet to the receiving side 200 and the RTO timer restarts clocking. When the second ACK transmits to the transmitting side 100 successfully, the RTO timer obtains the second RTT.

After the transmitting side 100 gets the second RTT, the transmitting side 100 calculates a first difference between the first and the second RTT, and then the second RTT and the first difference are defined as the linguistic variables (114) so as to be inputted into an inference engine of the transmitting side 100 (115). According to the fore-designed fuzzy rule, the inference engine outputs a first consequence and modifies the value of RTO based on the first consequence (116).

The step of transmitting a third packet is the same as the step of transmitting the second packet. In other words, the transmitting side 100 transmits a third packet (121) to the receiving side 200, and starts the RTO timer clocking a third RTT for the third packet. When the receiving side 200 receives the third packet (221), the receiving side 200 transmits a third ACK (222) to the transmitting side 100. When the third ACK transmits to the transmitting side 100 successfully, the transmitting side 100 calculates a third RTT and a second difference, and then the third RTT and the second difference are defined as the linguistic variables (124) so as to be inputted into the inference engine of the transmitting side 100 (125). According to the second consequence outputted by the inference engine, the inference engine modifies the value of RTO (126).

The second difference is based on the third RTT and the second RTT to be calculated. After the first packet transmits successfully, the transmitting steps of each packet will repeat the steps of the second packet. After each packet transmits successfully, the transmitting side 100 calculates a difference between two RTTs respectively corresponding to two adjacent packets of the plurality of packets and obtains the consequence to modify the value of RTO.

Additionally, in the above embodiment of the present invention, the transmitting side 100 and the receiving side 200 are devices which can transmit a receive packets, such as personal computers, servers, routers, and switches.

Figure 2:
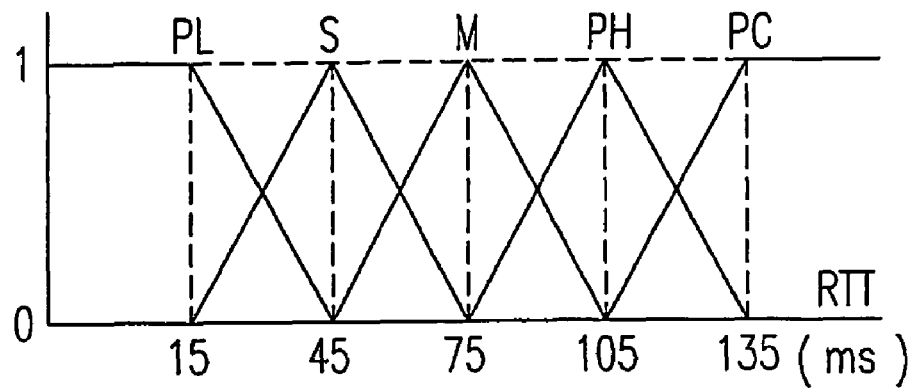
FIG. 2 is a distribution chart showing a membership function of a linguistic variable "round trip time"(RTT) in accordance with the embodiment of the present invention.

The fuzzy rule used in the fuzzy inference engine has two linguistic variables for input. Two linguistic variables are RTT and the difference between two RTTs respectively corresponding to two adjacent packets (ΔRTT). When the first packet transmits successfully, its RTT can be the value of RTO, and all the other RTTs of successfully transmitting packets can be the inputs of the fuzzy inference engine. FIG. 2 is a distribution chart showing the membership function of the linguistic variable RTT comprising five overlapped sets such as Possibly Light (PL), Smooth (S), Moderate (M), Possibly Heavy (PH), Possibly Congested (PC). If small RTTs are within the PL set, it indicates that the network traffic load is light. If large RTTs are within the PC set, there might be congested condition in the network.

Figure 3:
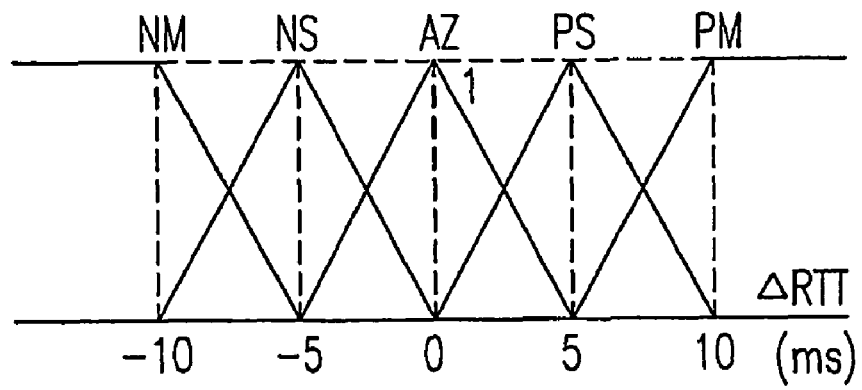
FIG. 3 is a distribution chart showing a membership function of a linguistic variable "difference of round trip time" (ΔRTT) in accordance with the embodiment of the present invention.

FIG. 3 is a distribution chart showing the membership function of the linguistic variable ΔRTT comprising five overlapped sets such as Negative Medium (NM), Negative Small (NS), About Zero (AZ), Positive Small (PS), Positive Medium (PM). If small ΔRTTs are within the NM set, it indicates that the values of the RTTs decrease a lot and conjectures that traffic load may decrease. If large ΔRTTs are within the PM set, it indicates that the values of the RTTs increase a lot and conjectures that traffic load may increase.

Figure 4:
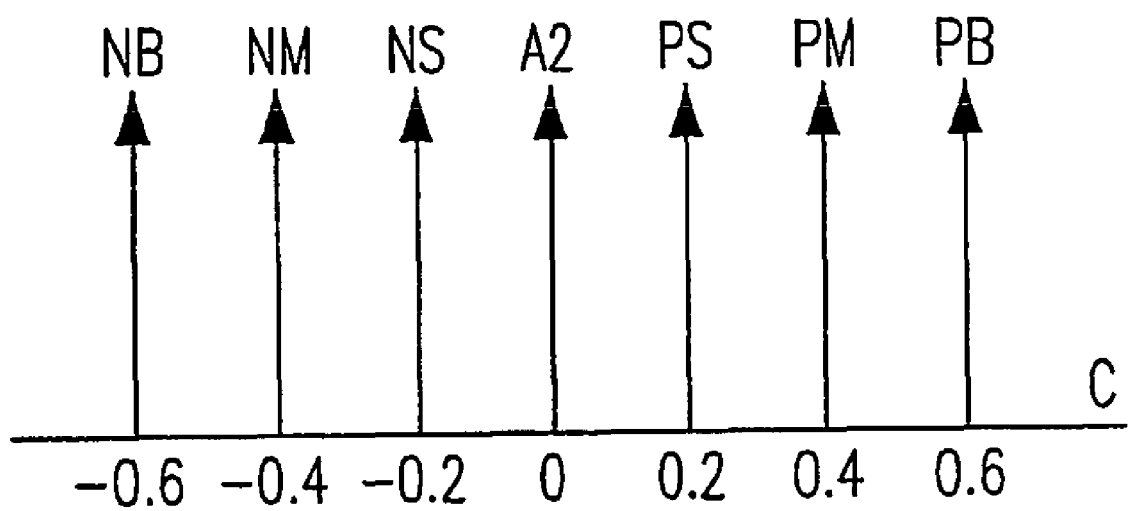
FIG. 4 is a distribution chart showing a membership function of a linguistic variable "consequence" (C) in accordance with the embodiment of the present invention.
Figure 5:
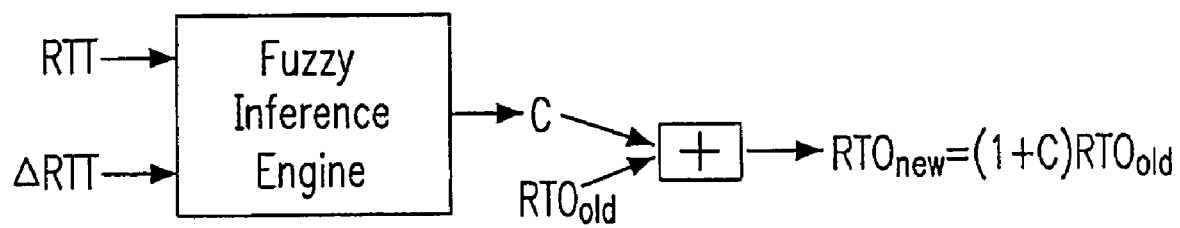
FIG. 5 is a schematic view showing a linguistic variable C modifying the RTO.

FIG. 4 is a distribution chart showing the membership function of the linguistic variable consequence (C) comprising seven overlapped sets such as Negative Big (NB), Negative Medium (NM), Negative Small (NS), About Zero (AZ), Positive Small (PS), Positive Medium (PM), Positive Big (PB). If small C is within the NM set, it indicates that the values of the $RTO_{NEW}$ decrease. Please refer to FIG. 5, which is a schematic view showing the linguistic variable C modifying the value of RTO, and the formula of modifying rule is:

$$RTO_{new} = (1+C)\, RTO_{old}.$$

Table 1 shows the fuzzy rule used in accordance with the embodiment of the present invention. The fuzzy rule includes 25 lists of fuzzy control language (FCL).

TABLE 1

1. If RTT is PL and ΔRTT is NM, then C is NB.
2. If RTT is PL and ΔRTT is NS, then C is NM.
3. If RTT is PL and ΔRTT is AZ, then C is NS.
4. If RTT is PL and ΔRTT is PS, then C is AZ.
5. If RTT is PL and ΔRTT is PM, then C is PS.
6. If RTT is S and ΔRTT is NM, then C is NB.

TABLE 1-continued

7. If RTT is S and ΔRTT is NS, then C is NS.
8. If RTT is S and ΔRTT is AZ, then C is AZ.
9. If RTT is S and ΔRTT is PS, then C is AZ.
10. If RTT is S and ΔRTT is PM, then C is PM.
11. If RTT is M and ΔRTT is NM, then C is NM.
12. If RTT is M and ΔRTT is NS, then C is AZ.
13. If RTT is M and ΔRTT is AZ, then C is AZ.
14. If RTT is M and ΔRTT is PS, then C is AZ.
15. If RTT is M and ΔRTT is PM, then C is PM.
16. If RTT is PM and ΔRTT is NM, then C is NM.
17. If RTT is PM and ΔRTT is NS, then C is AZ.
18. If RTT is PM and ΔRTT is AZ, then C is AZ.
19. If RTT is PM and ΔRTT is PS, then C is PS.
20. If RTT is PM and ΔRTT is PM, then C is PB.
21. If RTT is PC and ΔRTT is NM, then C is NS.
22. If RTT is PC and ΔRTT is NS, then C is AZ.
23. If RTT is PC and ΔRTT is AZ, then C is PS.
24. If RTT is PC and ΔRTT is PS, then C is PM.
25. If RTT is PC and ΔRTT is PM, then C is PB.

For example, rule 1 means if the network traffic load is light and decreases, then C is −0.6. Rule 11 means if the network traffic load is moderate and decreases, C is −0.4. Rule 25 means if the network traffic load increases a lot and congestion occurs, C is 0.6.

The embodiment of the present invention uses queuing model to simulate network transmission for testing its efficiency. It is proved that the present invention is used to decrease packet retransmission and solve the congestion collapse problem in network transmission. Therefore, the fuzzy inference engine of the present invention based on the fuzzy rule not only minimizes retransmission and lost packets, but also keeps utilization higher.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claim is:

1. A method for a network transmission, comprising the steps of:
   transmitting a plurality of packets;
   clocking a round trip time (RTT) for each of the packets;
   setting a first RTT as a retransmission timeout (RTO);
   obtaining a difference between two RTTs respectively corresponding to two adjacent packets of the plurality of packets;
   employing the RTT and the difference to generate an inference defined as a first membership function comprising a plurality of non-overlapped sets, wherein the RTT is defined as a second membership function comprising a plurality of overlapped sets and the difference is defined as a third membership function comprising a plurality of overlapped sets according to a fuzzy rule;
   outputting the inference; and
   modifying the RTO based on the inference.

2. The method for the network transmission according to claim 1 applied to a cable network.

3. The method for the network transmission according to claim 1, wherein the RTT, the difference, and the inference are defined as linguistic variables in the fuzzy rule.

4. A network transmission system comprising:
   a transmitting side transmitting a plurality of packets;
   a receiving side connected to the transmitting side and receiving the plurality of packets;
   a retransmission timeout (RTO) timer disposed in the receiving side, clocking a round trip time (RTT) for each of the plurality of packets, setting the RTT of a first packet of the plurality of packets as an RTO, and obtaining a difference between two RTTs respectively corresponding to two adjacent packets of the plurality of packets;
   an inference engine connected to the RTO timer receiving the RTT and the difference to obtain an inference defined as a first membership function comprising a plurality of non-overlapped sets, wherein the RTT is defined as a second membership function comprising a plurality of overlapped sets and the difference is defined as a third membership function comprising a plurality of overlapped sets and modifying the RTO based on the inference.

5. The network transmission system according to claim 4 applied to a cable network.

6. The network transmission system according to claim 4, wherein the inference engine is a fuzzy inference engine and the inference is obtained based on a fuzzy rule.

7. The network transmission system according to claim 6, wherein the RTT, the difference, and the inference are defined as linguistic variables in the fuzzy rule.

8. The network transmission system according to claim 4, wherein the transmitting and the receiving sides are connected by a network.

9. A method for improving a network transmitting efficiency, comprising the steps of:
   clocking a round trip time (RTT) for a plurality of packets;
   setting a first RTT as a retransmission timeout (RTO);
   obtaining a difference between two RTTs respectively corresponding to two adjacent packets of the plurality of packets;
   generating a parameter defined as a first membership function comprising a plurality of non-overlapped sets according to the RTT and the difference from a fuzzy rule, wherein the RTT is defined as a second membership function comprising a plurality of overlapped sets and the difference is defined as a third membership function comprising a plurality of overlapped sets; and
   determining whether the RTO should be modified according to the parameter.

10. The method for improving the network transmitting efficiency according to claim 9, wherein the steps further comprises a step of: transmitting a plurality of packets.

* * * * *